(12) United States Patent
Tsilimantos et al.

(10) Patent No.: US 10,999,204 B2
(45) Date of Patent: May 4, 2021

(54) SYSTEM, APPARATUS, AND METHOD FOR TRAFFIC PROFILING FOR MOBILE VIDEO STREAMING

(71) Applicant: Huawei Technologies Co., Ltd., Shenzhen (CN)

(72) Inventors: Dimitrios Tsilimantos, Boulogne Billancourt (FR); Stefan Valentin, Boulogne Billancourt (FR); Theodoros Karagkioules, Boulogne Billancourt (FR); Amaya Nogales Gomez, Boulogne Billancourt (FR); Xianwen Shi, Shenzhen (CN); Zhijun Chao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/688,601

(22) Filed: Nov. 19, 2019

(65) Prior Publication Data

US 2020/0092213 A1 Mar. 19, 2020

Related U.S. Application Data

(63) Continuation of application No. PCT/EP2017/062170, filed on May 19, 2017.

(51) Int. Cl.
*H04L 12/851* (2013.01)
*H04L 12/801* (2013.01)
(Continued)

(52) U.S. Cl.
CPC ......... *H04L 47/2483* (2013.01); *H04L 47/14* (2013.01); *H04L 47/2416* (2013.01);
(Continued)

(58) Field of Classification Search
CPC . H04L 47/2483; H04L 47/14; H04L 47/2416; H04L 47/28; H04L 47/30;
(Continued)

(56) References Cited

U.S. PATENT DOCUMENTS 7,664,048 B1 2/2010 Yung et al.
2011/0199934 A1* 8/2011 Olofsson ........... H04W 52/0216
370/252
(Continued)

FOREIGN PATENT DOCUMENTS

CN 102223260 A 10/2011
CN 103004190 A 3/2013
(Continued)

OTHER PUBLICATIONS

Essaili et al., "QoE-Based Traffic and Resource Management for Adaptive HTTP Video Delivery in LTE," IEEE Transactions on Circuits and Systems for Video Technology, vol. 25, No. 6, pp. 988-1001, Institute of Electrical and Electronics Engineers, New York, New York (Jun. 2015).
(Continued)

*Primary Examiner* — Afshawn M Towfighi
(74) *Attorney, Agent, or Firm* — Leydig, Voit & Mayer, Ltd.

(57) ABSTRACT

Traffic profiling in real time within a video streaming session is described. Multiple data packet flows at a lower layer of the OSI model are observed. A data packet flow pattern is obtained for each observed flow, and each obtained pattern is compared to a pre-defined characteristic streaming pattern. From the observed flows, any data packet flow that has its data packet flow pattern close to the pre-defined characteristic streaming pattern is selected as a video streaming flow. A buffer state of the video streaming flow is identified amongst a filling state, a steady state, and a depletion state,
(Continued)

by observing a slope of accumulated data over time. Eventually, multimedia-related information of the selected video streaming flow is provided based on its data packet flow pattern.

19 Claims, 12 Drawing Sheets

(51) Int. Cl.
| | |
|---|---|
| *H04L 12/853* | (2013.01) |
| *H04L 12/841* | (2013.01) |
| *H04L 12/835* | (2013.01) |
| *H04L 29/06* | (2006.01) |

(52) U.S. Cl.
CPC .............. *H04L 47/28* (2013.01); *H04L 47/30* (2013.01); *H04L 65/4069* (2013.01); *H04L 65/608* (2013.01); *H04L 65/80* (2013.01)

(58) Field of Classification Search
CPC ... H04L 65/4069; H04L 65/608; H04L 65/80; H04L 43/106; H04L 43/0864; H04L 43/0894

See application file for complete search history.

(56) References Cited

U.S. PATENT DOCUMENTS

| | | | |
|---|---|---|---|
| 2012/0236720 | A1 | 9/2012 | Dominguez Romero et al. |
| 2012/0327779 | A1 | 12/2012 | Gell et al. |
| 2013/0111060 | A1 | 5/2013 | Nilsson et al. |
| 2014/0082146 | A1 | 3/2014 | Bao et al. |
| 2015/0257035 | A1* | 9/2015 | Grinshpun ........ H04W 28/0284 370/235 |
| 2016/0080238 | A1 | 3/2016 | Bar-Yanai et al. |
| 2017/0041238 | A1* | 2/2017 | Do ........................ H04L 47/25 |

FOREIGN PATENT DOCUMENTS

| | | |
|---|---|---|
| CN | 103905820 A | 7/2014 |
| CN | 104394440 A | 3/2015 |
| CN | 104756539 A | 7/2015 |
| CN | 106550241 A | 3/2017 |
| EP | 2618524 A1 | 7/2013 |
| WO | 2010047630 A1 | 4/2010 |

OTHER PUBLICATIONS

Tsilimantons et al., "Anticipatory Radio Resource Management for Mobile Video Streaming with Linear Programming," Proceedings IEEE ICC 2016—Communication QoS, Reliability and Modeling Symposium, pp. 1-6, Institute of Electrical and Electronics Engineers (May 2016).
"Cisco Visual Networking Index: Global Mobile Data Traffic Forecast Update, 2016-2021", White Paper, pp. 1-35 (Feb. 7, 2017).
"Global Internet Phenomena: Latin America and North America," pp. 1-15, Sandvine Intelligent Broadband Networks, Waterloo, Ontario, Canada (Jun. 2016).
"Information technology—Dynamic adaptive streaming over HTTP (DASH)—Part 1: Media presentation description and segment formats," International Standard ISO/IEC, 23009-1, Second edition, pp. i-144 (May 15, 2014).
Pantos et al. "HTTP live streaming," draft-pantos-http-live-streaming-07, Informational Internet-Draft 2582, pp. 1-33, IETF (Sep. 2011).
Kakhki et al., "BingeOn Under the Microscope: Understanding T-Mobile's Zero-Rating Implementation," pp. 1-6 (Aug. 2016).
"Content Provider Technical Requirements for Binge On," pp. 1-3, https://www.t-mobile.com/content/dam/tmo/en-g/pdf/BingeOn-Video-Technical-Criteria-March-2016.pdf, Date Retrieved (Feb. 2017).
Veeravalli et al., "Quickest Change Detection," arXiv: 1210.5552v1, pp. 1-53, (Oct. 23, 2012).
"Big Buck Bunny," YouTube Video, Blender Foundation, https://www.youtube.com/watch?v=YE7VzILtp-4, Published (May 29, 2008).
"Tears of Steel," YouTube Video, Blender Foundation, https://www.youtube.com/watch?v=41hv2tW5Lc4, Published (Jun. 2, 2013).
"TCPDUMP & LiBPCAP," tcpdump packet analyzer v. 4.7.4, (libpcap v. 1.7.4), http://www.tcpdump.org, Date Retreved (Jan. 19, 2020).
"Wireshark," network protocol analyzer, https://www.wireshark.org, Date Retrieved (Jan. 19, 2020).
"IEEE Standard for Information technology—Telecommunications and information exchange between systems—Local and metropolitan area networks—Specific requirements, Part 11:Wireless LAN Medium Access Control(MAC) and Physical Layer (PHY) specifications, Amendment 4:Further Higher Data Rate Extension in the 24 GHz Band," IEEE Std 802.11g-2003, pp. i-67, Institute of Electrical and Electronics Engineers, New York, New York (Jun. 12, 2003).
"IEEE Standard for Information technology—Telecommunications and information exchange between systems Local and metropolitan area networks—Specific requirements, Part 11:Wireless LAN Medium Access Control (MAC) and Physical Layer(PHY) Specifications," IEEE Computer Society, IEEE Std 802.11-2012, pp. i-2695, Institute of Electrical and Electronics Engineers, New York, New York (Mar. 29, 2012).
"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11™-2016, pp. i-3532, Institute of Electrical and Electronics Engineers, New York, New York (Dec. 14, 2016).

* cited by examiner

| (%) | Identified | | |
|---|---|---|---|
| | Filling | Steady | Other |
| Filling | 99.2 | 0.1 | 0.7 |
| Steady | 0.0 | 99.0 | 1.0 |
| Other | 0.1 | 0.0 | 99.9 |

Fig. 10

SYSTEM, APPARATUS, AND METHOD FOR TRAFFIC PROFILING FOR MOBILE VIDEO STREAMING

CROSS-REFERENCE TO RELATED APPLICATIONS

This application is a continuation of International Application No. PCT/EP2017/062170, filed on May 19, 2017, the disclosure of which is hereby incorporated by reference in its entirety.

TECHNICAL FIELD

The present invention relates to the field of wireless communications, and more particularly, to traffic profiling for mobile video streaming.

BACKGROUND

In 2016, video accounted for 60% of the global data traffic in cellular networks and this proportion is expected to increase to 78% by 2021, as found in Cisco, "Visual networking index: Global mobile data traffic forecast update, 2016-2021", White Paper, February 2017. Most of this data traffic is generated by major video-on-demand (VoD) streaming services and based on hypertext transfer protocol (HTTP) adaptive streaming (HAS) techniques as standardized in dynamic adaptive streaming over HTTP (DASH) and specified in HTTP live streaming (HLS).

Although bitrate and real-time requirements of these services can often be supported in modern cellular networks, sparsely covered areas and the tightening requirements of new services represent a major challenge. Even the next generation of cellular network technology will struggle to meet the demands of 4K-resolution video, 360° live videos, and real-time cloud rendering services for a substantial number of users per cell.

There is now a wide consensus that stalls are the dominant quality-of-experience (QoE) factor for mobile HAS, as disruptions quickly cause viewers to abandon their video session. This high impact of the video traffic's real-time requirement, as defined by the level of the play-back buffer, is often intensified by the greedy quality selection of HAS clients. Once the video traffic is served with a higher bitrate, the HAS client will continue to increase the quality, thereby requesting a higher and higher rate from the network while increasing the risk of a stall. This combination of greediness and real-time requirements makes it challenging to provide sufficient QoE for video streaming while simultaneously satisfying other traffic types, such as voice and best-effort data, over the shared resources of a mobile network.

Interestingly, HAS traffic has fundamental characteristics that can be exploited for more efficient scheduling, as divulged in A. E. Essaili et al., "QoE-based traffic and resource management for adaptive HTTP video delivery in LTE", IEEE Trans. Circuits Syst. Video Technol., vol. 25, no. 6, pp. 988-1001, June 2015 and in D. Tsilimantos, A. Nogales-Gomez and S. Valentin, "Anticipatory radio resource management for mobile video streaming with linear programming", Proceedings IEEE ICC, May 2016, pp. 1-6. Thus, schedulers with knowledge of video key parameters, such as video bit-rate and buffer level, can adjust their priority weights and improve the overall QoE in the network.

Video key parameters, such as application-layer parameters from ongoing data flows at layer 2 or 3, can be obtained based on cross-layer signaling and deep packet inspection (DPI). However, these methods come with significant drawbacks.

Cross-layer signaling has to be adopted by the operators of over-the-top (OTT) services (OTTs) and, so far, all attempts to standardize such signaling interfaces and protocols have failed. Even with such standards in place, the conflicting technical objectives between OTTs and network operators (NOs) make their adoption unlikely. OTTs aim to maximize QoE for given networks limits, whereas NOs aim to maximize network efficiency for a given QoE limit. Typically, OTTs have little or no interest in providing transparency to the lower protocol layers wherein NOs operate.

In A. Molavi Kakhki et al., "BingeOn under the microscope: Understanding T-Mobile's zero-rating implementation", Proceedings ACM SIGCOMM WS, August 2016, a rate throttling mechanism is described and used by a specific NO in order to manage video traffic in its mobile network. It is described how this approach suffers from the limits of DPI, which is technically difficult or impossible to implement with end-to-end encryption or privacy standards such as transport layer security (TLS) and secure sockets layer (SSL). Due to the common use of TLS/SSL, DPI requires NOs and OTT service providers to cooperate in order to either tag the video packet flows or to weaken end-to-end encryption. The article describes that even with such cooperation, tags can be easily falsified by an adversary to receive an economic benefit; thereby leading to an arms race between operators and malicious users. These structural problems of DPI are combined with high computational cost, since inspection has to happen in real time, at high throughput, for a large number of users. In addition to those technical problems, the usage of DPI may be restricted by legal constraints since it enables access to sensitive information (e.g., the identification of the specific video delivered to a user), which may represent a breach of privacy.

SUMMARY

The present disclosure describes providing multimedia or video parameters to network layers in real time and without the need for tagging or violating end-to-end encryption. At the lower layers, this information can then be used to enhance network optimization and data traffic management.

According to a first aspect, the invention relates to an apparatus for profiling video streaming traffic in real time within a video streaming session, wherein the video streaming traffic comprises one or more data packet flows. For example, the data packet flows may be data packet flows at a lower layer of the open systems interconnection (OSI) model. The apparatus is configured to obtain, for each of the one or more data packet flows, a respective data packet flow pattern based on the respective data packet flow (in other words, to generate a respective data packet flow pattern based on the respective data flow), compare each obtained data packet flow pattern to a pre-defined characteristic streaming pattern, select, as a video streaming flow, a data packet flow from the one or more data packet flows that has its data packet flow pattern close to the pre-defined characteristic streaming pattern, identify a buffer state of the selected video streaming flow amongst a filling state, a steady state subsequent to the filling state and a depletion state, by observing a slope of accumulated data over time, and provide multimedia-related information of the selected video streaming flow based on its data packet flow pattern and its identified buffer state.

One advantage of the apparatus is that detection of video flows cannot be as easily manipulated as in DPI, for example. Compared to some alternative techniques (such as DPI or tagging), it will be more difficult (and even impossible in many practical scenarios) to disguise non-video packet flows as video flows. This is so because the apparatus uses characteristic streaming patterns, which may be based on fundamental properties of video streaming.

Another advantage of the apparatus over DPI is lower computational complexity. Furthermore, in contrast to cross-layer signaling or tagging schemes, there is no signaling overhead. Both are conceptual benefits, which can be easily translated in efficient implementations.

Yet another advantage of the apparatus is that important operational parameters can be determined directly from a video flow. Note that DPI does not allow the buffer state and the video streaming rate to be determined, for example. While cross-layer signaling is efficient in occasional signaling, for aperiodic events such as buffer state, it is not suited for determining the streaming rate and other parameters in real time, due to the high signaling overhead involved.

Yet another advantage of the apparatus is that it can operate with transport-layer encryption and content encryption (independently of the layer). This is not a given with DPI and tagging. If content is encrypted, DPI cannot easily extract parameters from it. The apparatus, in contrast, is capable of doing this with a high accuracy. Cross-layer signaling establishes a dedicated signaling channel, and therefore, can operate with the above encryption types; however, it would require standardization and cooperation between OTT service operators and network operators. Standardization or cooperation is not necessary for the proposed apparatus, thus allowing fast implementation and deployment.

The data packet flows may notably be data packet flows at a lower layer of, e.g., the OSI model. By observing them, the proposed apparatus requires no direct access to the application-layer susceptible of violating user privacy, so that there is no need to weaken end-to-end encryption via TLS and/or SSL. Furthermore, the multimedia-related information can be provided in an estimated form.

According to a further implementation form of the first aspect, the video streaming session is a hypertext transfer protocol (HTTP) adaptive streaming (HAS) session.

It should be noted that a majority of multimedia traffic is generated by HAS protocol using TLS/SSL encryption, and the proposed apparatus may provide the multimedia-related information even though the data traffic is encrypted.

According to a further implementation form of the first aspect, the data packet flow pattern is obtained by observing each data packet from the respective data packet flow, each observed data packet being placed in a transmit queue.

According to a further implementation form of the first aspect, the data packet flow pattern comprises a size and a timestamp of each data packet from the respective data packet flow.

It should be noted that the size and the timestamp of each data packet may be directly available in a lower layer or sub-layer of the OSI model.

According to a further implementation form of the first aspect, the selected video streaming flow is indexed by its source internet protocol (IP) address and its destination transmission control protocol (TCP) ports.

According to a further implementation form of the first aspect, the buffer state of the selected video streaming flow is identified based on a determination of both a streaming rate pattern and an on-off transmission pattern of data bursts.

According to a further implementation form of the first aspect, the buffer state of the selected video streaming flow is identified based, additionally, on the timestamp of each data packet with hypertext transfer protocol (HTTP) GET request in its respective HTTP header field.

According to a further implementation form of the first aspect, the filling state is detected by long data bursts and the steady state is detected by iterative shorter data bursts of similar duration.

According to a further implementation form of the first aspect, the streaming rate of the streaming rate pattern is estimated in the steady state.

It should be noted that the streaming rate may be calculated in the steady state at the beginning of each new data burst until the detection of a new (i.e., next) filling state. During a steady state phase, the estimated streaming rate is close to the video encoding rate of the played-out data, thereby leading to an optimized estimation. Conversely, the streaming rate should not be estimated in the filling state because the estimated streaming rate is, during a filling phase, much greater than the video encoding rate of the played-out data, thereby leading to an erroneous and unacceptable estimation.

According to a further implementation form of the first aspect, the determination of the streaming rate pattern is performed by observing the slope of the accumulated size of data packets over time, the timestamps of the data packets being used for time reference, and wherein the determination of the on-off transmission pattern of data bursts is performed by analyzing the timestamp and the size of each data packet in order to separate data bursts and get characteristics, such as duration and rate, for each data burst.

According to a further implementation form of the first aspect, the buffer state of the selected video streaming flow is identified when a change in the streaming rate matches a change in the on-off transmission pattern of data bursts in terms of type of state and time of change.

According to a further implementation form of the first aspect, the multimedia-related information comprises a set of multimedia-related parameters and state variables of the selected video streaming flow.

According to a further implementation form of the first aspect, the set of multimedia-related parameters comprises the values of a source coding rate, a target buffer level, a latency class and a current buffer level, and the set of state variables comprises the values of a playback buffer state and an adaptation event.

According to a further implementation form of the first aspect, the buffer state of the selected video streaming flow is identified based on a classification model.

According to a further implementation form of the first aspect, the lower layer of the OSI model is a data link layer as layer 2 or a network layer as layer 3.

According to the second aspect, the invention relates to a serving node comprising an apparatus as claimed in the first aspect and any one of the implementation forms of the first aspect.

The serving node may be configured to be connected to a video client located near the serving node. That connection may be wired or wireless. When the serving node is located near the video client, the measured packet arrival time will likely be close to the packet arrival time at the video client. For example, if the video client is located in a mobile device, it may be advantageous to deploy the apparatus nearby the mobile device, e.g., at a base station or an access point.

According to a further implementation form of the second aspect, the transmit queue is inside the serving node.

According to a further implementation form of the second aspect, the multimedia-related information of the selected video streaming flow is provided from the apparatus towards a scheduler.

Thereby, the scheduler may adjust its priority weights and improve the overall quality-of-experience (QoE) in the network.

According to a further implementation form of the second aspect, the serving node is configured to be one of a router, a gateway, a base station (BS), and an access point (AP).

It should be noted that the serving node may be an edge-serving node, so that the data packet flows at a lower layer of the OSI model may be observed at the edge of the mobile network, which allows for better observation and recognition of the data packet flow patterns.

According to the third aspect, the invention relates to a video streaming system comprising a video server, a serving node as claimed in the second aspect and any one of the implementation forms of the second aspect, and a video client as specified in a further implementation of the second aspect.

According to the fourth aspect, the invention relates to a method for profiling a video streaming traffic in real time within a video streaming session, wherein the video streaming traffic comprises one or more data packet flows. The method comprises a step of obtaining, from the one or more data packet flows at a lower layer of the open systems interconnection (OSI) model and for each of them, a respective data packet flow pattern (in other word, generating a respective data packet flow pattern based on the respective data flow), a step of comparing each obtained data packet flow pattern to a pre-defined characteristic streaming pattern, a step of selecting, as a video streaming flow, a data packet flow from the one or more data packet flows that has its data packet flow pattern close to the pre-defined characteristic streaming pattern, a step of identifying a buffer state of the selected video streaming flow amongst a filling state, a steady state subsequent to the filling state, and a depletion state, by observing a slope of accumulated data of the buffer over time, and a step of providing multimedia-related information of the selected video streaming flow based on its data packet flow pattern and its identified buffer state.

The method has the same or similar advantages as the apparatus of the first aspect.

According to a further implementation form of the fourth aspect, the step of obtaining the data packet flow pattern comprises observing each data packet from the respective data packet flow, each observed data packet being placed in a transmit queue.

According to a further implementation form of the fourth aspect, the data packet flow pattern comprises a size and a timestamp of each data packet from the respective data packet flow.

According to a further implementation form of the fourth aspect, the step of selecting, as a video streaming flow, a data packet flow comprises indexing the selected video streaming flow by its source internet protocol (IP) address and its destination transmission control protocol (TCP) ports.

According to a further implementation form of the fourth aspect, the step of identifying the buffer state of the selected video streaming flow comprises determining both a streaming rate pattern and an on-off transmission pattern of data bursts.

According to a further implementation form of the fourth aspect, the step of determining the streaming rate comprises observing the slope of the accumulated size of packets over time, where the packet timestamps are used for time reference, and wherein the step of determining the on-off transmission pattern of data bursts comprises analyzing the timestamp and the size of each data packet in order to separate data bursts and get characteristics as duration and rate for each burst.

According to a further implementation form of the fourth aspect, the step of identifying the buffer state of the selected video streaming flow comprises matching, in terms of type of state and time of change, a change in the streaming rate and a change in the on-off transmission pattern of data bursts.

According to a further implementation form of the fourth aspect, the step of identifying the buffer state of the selected video streaming flow comprises implementing a classification model.

According to the fifth aspect, the invention relates to a computer program comprising program code for performing the method according to the fourth aspect or any one of the implementation forms of the fourth aspect when executed on a computer.

Thereby, the method can be performed in an automatic and repeatable manner.

The computer program can be executed by the above described apparatuses.

For example, it should be noted that all the above apparatuses may be implemented via discrete hardware circuitry with discrete hardware components, integrated chips or arrangements of chip modules, or via a signal processing device or chip controlled by a software routine or program stored in a memory, written on a computer-readable medium or downloaded from a network such as the Internet.

It shall further be understood that a preferred embodiment of the invention can also be any combination of the dependent claims or above embodiments with the respective independent claim.

These and other aspects of the invention will be elucidated with reference to the embodiments described hereinafter.

BRIEF DESCRIPTION OF THE DRAWINGS

In the following detailed portion of the present disclosure, the invention will be explained in more detail with reference to the exemplary embodiments shown in the drawings, in which:

FIG. 10 shows a confusion matrix of a buffer state detection, according to an embodiment of the present invention;

Identical reference signs are used for identical or at least functionally equivalent features.

DETAILED DESCRIPTION OF EMBODIMENTS OF THE INVENTION

Figure 1:
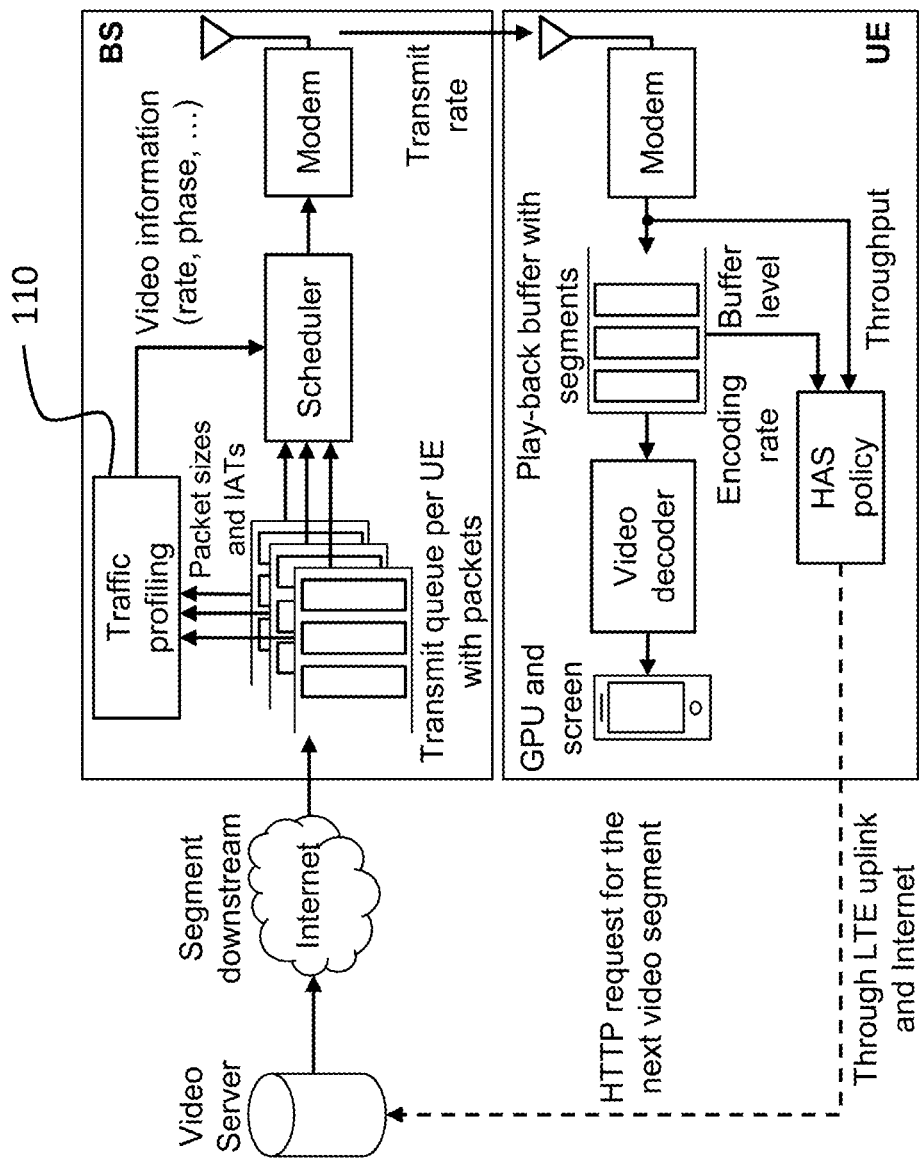
FIG. 1 shows a video streaming system 100 comprising a video server, a serving node (BS) and a video client (UE), according to an embodiment of the present invention.

FIG. 1 shows a video streaming system 100 comprising a video server, an intermediate or serving node (e.g., a base station (BS), a router, a gateway, or an access point (AP)) and a video client (e.g., a user equipment (UE)), according to an embodiment of the present invention. As depicted therein, a traffic profiling apparatus 110 runs at the serving node (e.g., the BS).

In one embodiment, the serving node comprises a scheduler, and the traffic profiling apparatus 110 provides that scheduler with video- or multimedia-related information. The video- or multimedia-related information may include, for example, rate information and phase information. The serving node, may, for example, be a BS (e.g., a BS in a UMTS, LTE, or 5G system) or an AP of a WLAN (e.g., an IEEE 802.11 WLAN).

In another embodiment, the serving node does not comprise a scheduler. In this case, the traffic profiling apparatus 110 may provide functions such as routing, traffic and admission control, for example. The serving node may, for example, be a router or a gateway.

As in any video streaming system, a client application at the video client (e.g., the UE device) employs a play-back buffer with segments to compensate for short throughput reduction and sudden increase in video encoding rate. In the case of a HAS system, a single video sequence is usually subdivided into segments of a constant duration of, e.g., several seconds. Each segment is stored at the video server in multiple quality levels and requested sequentially by the video client. For each segment, the video client adapts the quality and the request time depending on the transmission control protocol (TCP) throughput and the play-back buffer level.

At the serving node (e.g., the BS), arriving IP packets are separated into one or more data packet flows, for example, by placing the IP packets in user-specific queues. For each data packet flow, the serving node obtains data packet flow attributes (also named data packet flow patterns) from the arriving data packets of the respective data packet flow which are directly available at a lower layer (i.e., sub-layer) of the open systems interconnection (OSI) model. The data packet flow attributes or patterns may include, for example, packet sizes (e.g., in protocol data unit (PDU)) and/or arrival times (ATs) (e.g., in unit of seconds (s)) and/or inter-arrival times (IATs) (e.g., in unit of seconds (s)). In one embodiment the IP packets are placed in user-specific queues; the IP packets are observed, the data packet flow attributes or patterns are extracted from the queues, for example, at a given measurement frequency, and are then used for traffic profiling.

In another embodiment, the IP packets may not be placed in user-specific queues. The serving node may use packet information to separate the data packet flows, and it may then observe each data packet flow, obtain data packet flow attributes or patterns, for example, at a given measurement frequency, and use them for traffic profiling.

Figure 2:
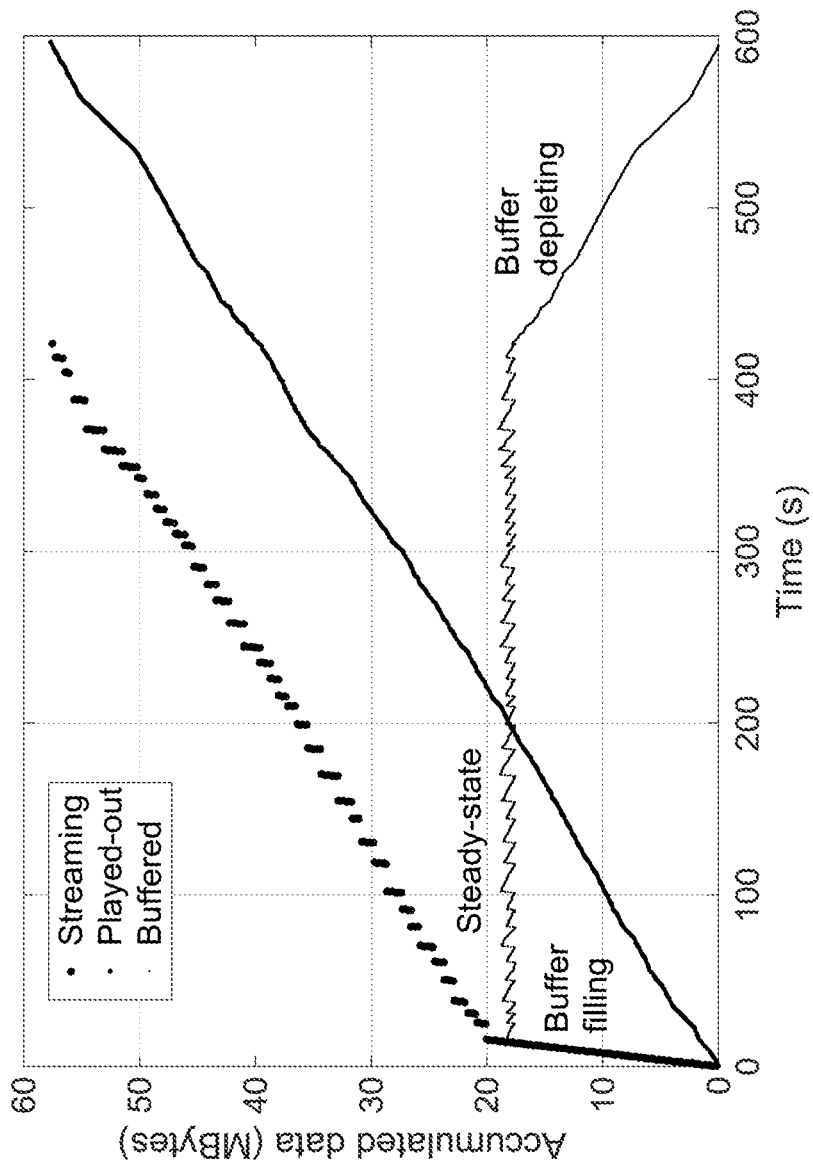
FIG. 2 shows an exemplary diagram of accumulated data over time for (i) transmission control protocol (TCP) payload of streaming data, (ii) played-out data and (iii) playback buffer level within a HAS session.

FIG. 2 illustrates the downstream of a typical HAS session. This drawing shows the accumulated data (in MBytes) over time for: (i) transmission control protocol (TCP) payload of streaming data as observed in the BS downlink transmit queue, and (ii) played-out data as acquired by analyzing the downloaded video segments. Then, subtracting the played-out data (ii) from the TCP payload of streaming data (i) provides: (iii) the play-back buffer level.

By looking at the slope of the plots, three main phases of an adaptive streaming session distinctly appear over time. During the first phase, denoted by buffer filling or filling phase, there is an initial burst of data where the streaming rate is higher (e.g., several times higher) than the played-out rate. During this time period, the HAS client requests a maximum throughput to quickly fill the buffer up to a certain level. Once this level has been reached, the HAS client changes to a second phase, denoted by steady-state phase, in order to match its requested streaming rate of the streaming data to the video encoding rate of the played-out data. The HAS protocol achieves this rate match through a characteristic on-off request pattern, which leads to short data packet bursts, followed by periods without any data packet transmission. These burst-wise requests control the streaming rate and keep the buffer level almost steady around a target level. Eventually, after the entire video has been transmitted, the HAS session ends by playing-out the remaining bits from the buffer during a third phase, denoted by buffer depletion or depletion phase. A depletion phase may also appear at any point of the streaming session. For example, it may appear if the user throughput is not sufficient to support the current video quality.

It should be noted that such a downstream of FIG. 2 is obtained for any HAS protocol of significant buffer size. It results therefrom that application-layer parameters can be derived from an observation of data packet flows at a lower layer of the OSI model, such as a data link layer (i.e., layer 2) and a network layer (i.e., layer 3), if these data packet flows operate, for example, according to the following protocols:

VoD streaming with playback buffers in the order of 100 seconds or more;

live streaming, which is technically equivalent to VoD but with playback buffers in the order of 1 or 10 seconds;

DASH or HLS specification;

TCP or user datagram protocol (UDP) or quick UDP internet connections (QUIC); and TLS/SSL encryption.

Figure 3:
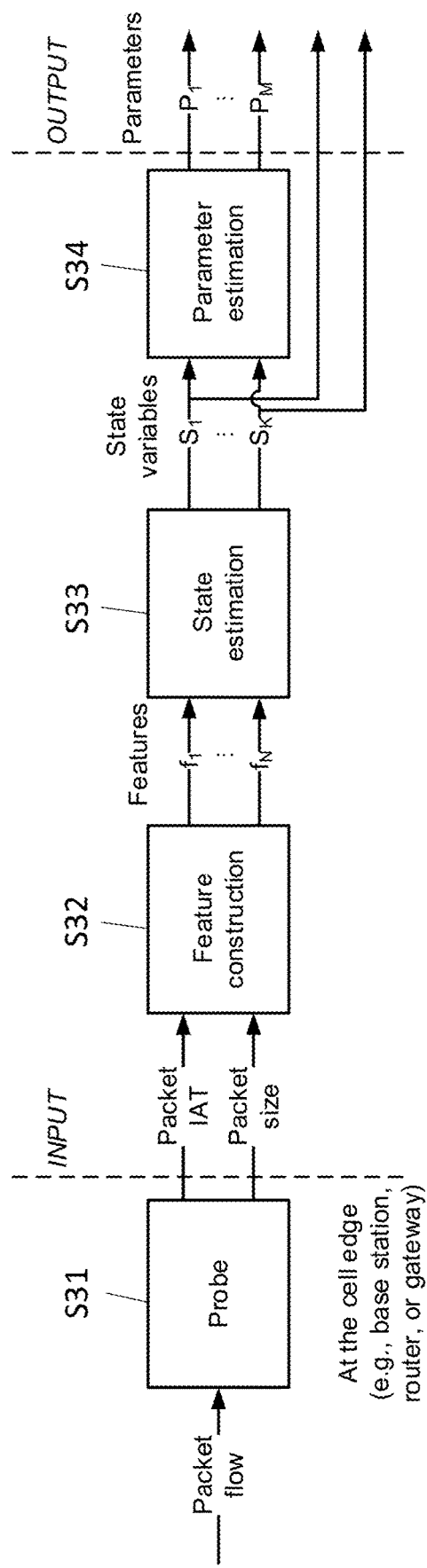
FIG. 3 shows a schematic diagram illustrating operation of a traffic profiling apparatus 110 according to an embodiment of the present invention.

FIG. 3 shows a schematic diagram illustrating the way the traffic profiling apparatus 110 operates according to an embodiment of the present invention.

Referring to the exemplary embodiment of FIG. 3, the traffic profiling apparatus 110 of FIG. 1 may run at the intermediate or serving node (e.g., the BS) by observing and probing data packet flows and by providing its video-aware scheduler (denoted by scheduler in FIG. 1) with video- or multimedia-related information, said information comprising a set of M estimated multimedia-related parameters (depicted by $P_1, \ldots, P_M$) and a set of K estimated state variables (depicted by $S_1, \ldots, S_K$). Thus, the traffic profiling apparatus 110 may be configured to profile a video streaming traffic in real time within a video streaming session (e.g., a HAS session).

To do so, the traffic profiling apparatus 110 may first observe and probe at a step S31 one or more data packet flows at a lower layer (e.g., layer 2 or 3) of the OSI model. The data packet flows to be observed arrive at the intermediate or serving node (e.g., the BS) and are placed in a transmit queue per video client (e.g., per UE device) inside the intermediate or serving node in order to be observed. In an exemplary embodiment, the data packet flows may be observed at a cell edge of a mobile network (e.g., at a BS, a gateway, a router or an AP), and the intermediate or serving node may be located close to the end point (e.g., the UE device as video client) of the multimedia stream in order to assure that intermediate measurements are strongly correlated with their respective end-to-end metrics. However, it should be noted that neither access to nor information from the end points (e.g., the video server and the video client) of the transmission chain are required.

Then, the traffic profiling apparatus 110 may obtain, at its input and for each one of the observed one or more data packet flows, a respective data packet flow pattern. The data packet flow pattern may comprise a size and a timestamp (e.g., an inter-arrival time (IAT)) of each data packet from the respective data packet flow.

In next steps, N multimedia-related features (depicted by $f_1, \ldots, f_N$), such as discrete gradients or slopes of accumulated data over time, burst events and duration, are constructed at a step S32 using the obtained data packet flow patterns (e.g., the sizes and IATs of each data packet) prior to estimating state variables ($S_1, \ldots, S_K$) at a step S33.

At the beginning, each obtained data packet flow pattern may be compared to a pre-defined characteristic streaming pattern.

Then, from the observed one or more data packet flows, any data packet flow having its data packet flow pattern close to the pre-defined characteristic streaming pattern may be selected as a video streaming flow.

Then, the selected video streaming flow may be indexed using information from a header of any data packet from the selected video streaming flow. For example, the selected video streaming flow may be indexed by its source internet protocol (IP) address and its destination transmission control protocol (TCP) ports, which is sufficient to isolate this selected video streaming flow from the arriving data packet flows.

Then, a buffer state of the selected and indexed video streaming flow amongst a filling state, a steady state subsequent to the filling state and a depletion state, may be identified in a recognizable manner by observing a slope of accumulated data over time. On the basis that a burst may be defined as the set of data packets with a respective IAT less than a threshold, the filling state may be detected by long data bursts, whereas the steady state may be detected by iterative shorter data bursts of similar duration. For example, the buffer state of the selected and indexed video streaming flow may be identified based on only a determination of both a streaming rate pattern and an on-off transmission pattern of data bursts, or based on a combination of that determination with the timestamp of each data packet with hypertext transfer protocol (HTTP) GET request in their respective HTTP header field. To improve estimation accuracy, the streaming rate of the streaming rate pattern may be estimated in the steady state. Furthermore, the determination of the streaming rate pattern may be performed by observing the slope of the accumulated size of data packets over time, the timestamps of the data packets being used for time reference, while the determination of the on-off transmission pattern of data bursts may be performed by analyzing the timestamp and the size of each data packet in order to separate data bursts and get characteristics as duration and rate for each data burst. In addition, the buffer state of the selected and indexed video streaming flow may be identified when a change in the streaming rate matches a change in the on-off transmission pattern of data bursts in terms of type of state and time of change.

Finally, the constructed multimedia-related features ($f_1, \ldots, f_N$), as discrete gradients or slopes of accumulated data over time, burst events and duration, may be used in order to output respective multimedia-related information of the selected and indexed video streaming flows towards, for example, the scheduler associated with the traffic profiling apparatus 110. The multimedia-related information assigned to each selected and indexed video streaming flow may comprise a set of estimated state variables ($S_1, \ldots, S_K$) obtained from the step S33, such as the values of a playback buffer state (e.g., filling state, steady state or depletion state) and an adaptation event (e.g., quality change: quality decrease or quality increase), and a set of estimated multimedia-related parameters ($P_1, \ldots, P_M$) such as the values of a source coding rate (in bits/s), a target buffer level (in Bytes or seconds), a latency class (e.g., live streaming, VoD) and a current buffer level (in Bytes or seconds), which may be obtained from the step S34 through a dependency relationship with the estimated state variables ($S_1, \ldots, S_K$).

Figure 4:
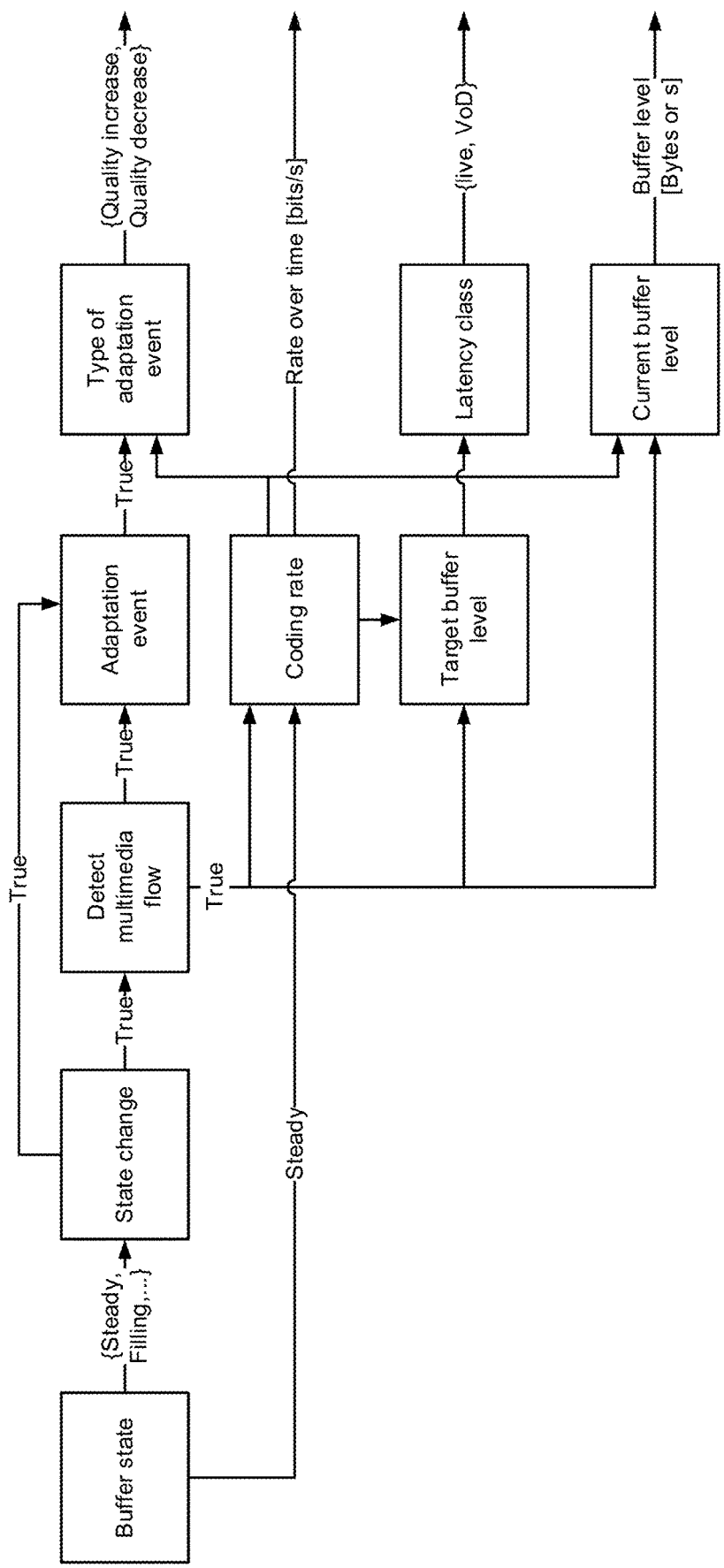
FIG. 4 shows a schematic diagram illustrating the logical dependencies between the estimated state variables ($S_1, \ldots, S_K$) and the estimated multimedia-related parameters ($P_1, \ldots, P_M$), according to an embodiment of the present invention.

This dependency relationship between the estimated state variables ($S_1, \ldots, S_K$) and the estimated multimedia-related parameters ($P_1, \ldots, P_M$) is illustrated in FIG. 4 and described hereafter.

Playback buffer state: The playback buffer state is identified using an algorithm as shown in the flow diagram of FIG. 5. Firstly, from the arriving data packets placed in the transmit queue (step S51), the size and the arrival time (e.g., IAT) of the data packets are observed and collected per tuple of source IP address and destination TCP port (step S52). Then, two methods are applied in parallel and the results of each method are combined in view of the final decision.

The first method is based on the streaming rate (step S53A) and aims to detect significant changes in the data rate (step S55A). For any arriving packet of index k, a payload size ($s_k$) is measured and aggregated within a time interval of duration $\Delta t$. For any interval of index t, this aggregation provides the streaming rate ($\rho_t$) estimated as follows:

$$\rho_t = \frac{\sum_{k \in K_t} s_k}{\Delta t} \quad (1)$$

where $K_t$ is the set of packets that have arrived within this interval.

Afterwards, in order to avoid detection errors due to small variations, change detection is performed on a smoothed time series (step S54A). For example, the smooth data rate ($r^s_t$) from a regressive low-pass filter with attenuation factor α may be obtained as follows:

$$r_t^s = (1-\alpha)r_{t-1}^s + \alpha \rho_t \tag{2}$$

Significant rate changes are then detected by comparison to a threshold (step S55A). This embodiment uses the following rule:

$$f_t = \begin{cases} 1 & \text{if } r_t^s > c r_{t,max}^s \text{ and } f_{t-1} = -1 \\ -1 & \text{if } r_t^s < (1-c) r_{t,max}^s \text{ and } f_{t-1} = 1 \\ f_{t-1} & \text{otherwise} \end{cases} \tag{3}$$

where $r^s_{t,max} = \max(r^s_t)$ is the maximum smoothed rate until time t, factor c is a constant and $f_t$ is a flag, with $f_0=-1$, that indicates rate changes, i.e., a rate increase at time t in the case of a transition from $f_{t-1}=-1$ to $f_t=1$ and a rate decrease in the case of an inverse transition.

The second method is based on detecting the steady-state phase, i.e., detecting the on-off transmission pattern. It is the reason why the IATs of the data packets are analyzed (step S53B) in order to separate the data bursts ($b_n$) and thereby allow per-burst characteristics, such as size ($b^s_n$), duration ($b^d_n$), and rate ($b^r_n$), to be calculated (step S54B). Since long bursts and shorter repetitive bursts of similar duration are good indicators of a filling state and a steady state, respectively, this embodiment uses the following static rule (step S55B):

$$b_n = \begin{cases} 1 & \text{if } b_n^d \geq h_d \text{ and } b_n^r \geq h_r b_1^r \\ -1 & \text{if } b_n^d < h_d \text{ and } b_n^r \geq h_r b_1^r \\ 0 & \text{otherwise} \end{cases} \tag{4}$$

where $h_r$ is a threshold for the rate, ha is a threshold for the size, and $b_n$ is a flag that indicates a potential data burst of a filling state for $b_n=1$ and a potential data burst of a steady state for $b_n=-1$.

Alternative embodiments may apply other classification techniques like the support vector machines (SVMs), which are based on features constructed by burst characteristics, such as size, rate and duration of following idle time. Then, after training offline a set of data with labels, new data are classified online according to such a SVM classifier.

Figure 5:
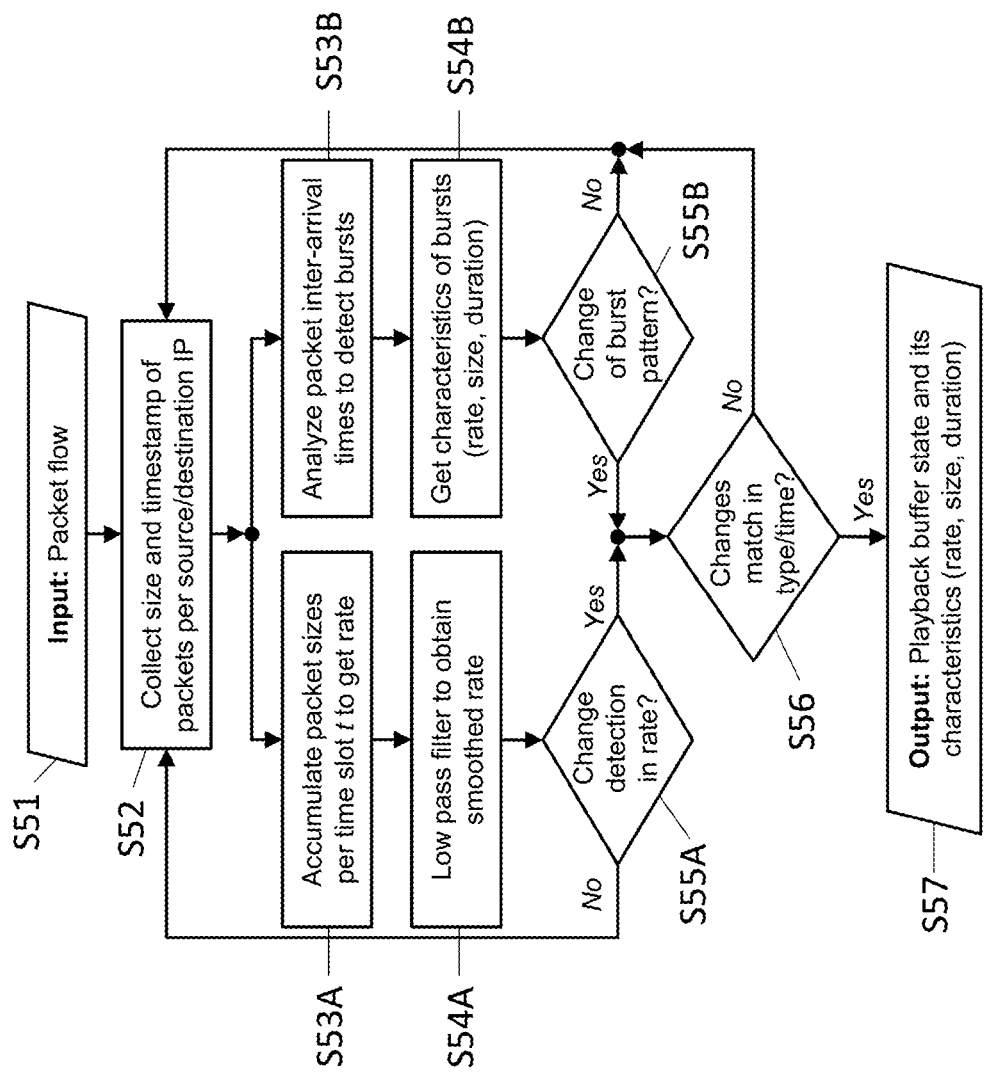
FIG. 5 shows a flow diagram illustrating an algorithm to identify the playback buffer state, according to an embodiment of the present invention.

As shown in FIG. 5, the output of both methods is compared (step S56) in terms of type of buffer state amongst the filling state, the steady state and the depletion state, and in terms of estimated time of change, by allowing a short deviation in the order of a few seconds. If the results match, the algorithm detects the playback buffer state (step S57) and provides characteristics of each detected state, such as the average streaming rate and the size of the downloaded video data (step S57). The process is iteratively repeated in order to detect new buffer states.

HAS data flow identification: Once the system detects a filling phase followed by a steady state, an HAS data flow is identified. The source IP address and destination TCP ports of the HAS data flow are then extracted from the headers of the respective IP packets. Any following operation is performed on the IP packets of the isolated HAS data flow.

Coding rate: Once the traffic profiling apparatus 110 detects a video streaming data flow, the source coding rate may be estimated as the streaming rate, which is measured during the entire steady-state phase, thereby providing the average value of the coding rate of the steady state for the corresponding video/audio quality, and during the duration of at least one burst and including the idle duration that follows the burst, in order to provide the average coding rate for a shorter period of one or more video segments.

Figure 6:
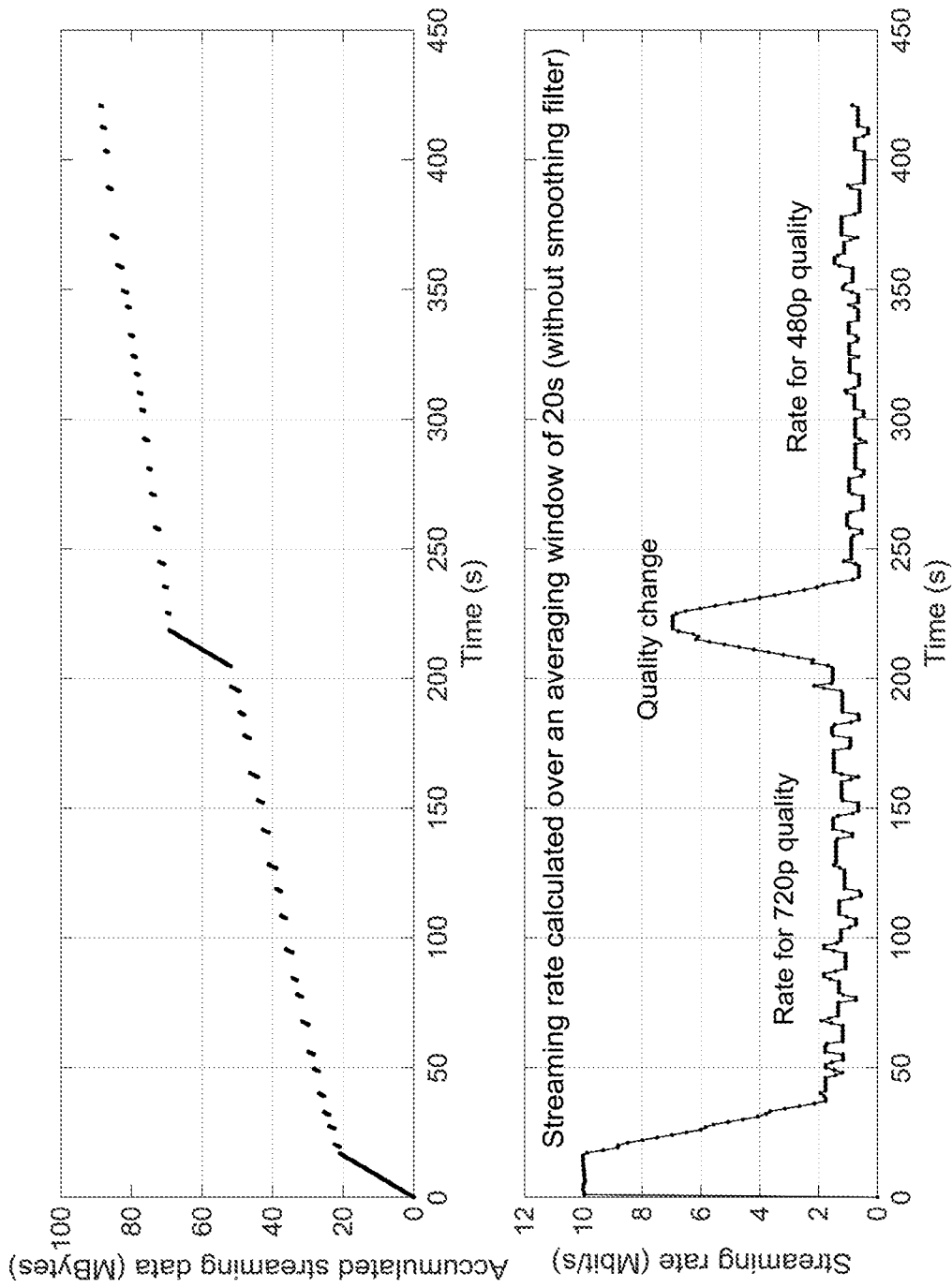
FIGS. 6a and 6b show, in FIG. 6a, a cumulative sum of streaming data and, in FIG. 6b, a respective streaming rate over time during a video session with a quality change from 720p to 480p, according to an embodiment of the present invention.

An example of such a shorter averaging window is presented in FIGS. 6a and 6b, where the video quality is changed from 720p to 480p at a time of 200 seconds during the video session. FIG. 6a shows the streaming data (in MBytes) accumulated over time (in seconds) and FIG. 6b shows the streaming rate (in Mbit/s) calculated over time (in seconds) within an averaging window of 20s. It should be noted that the steady state is the precondition for an accurate estimation of the coding rate since the coding rate has no direct relationship with the rates requested during the buffer filling and depletion phases.

Figure 7:
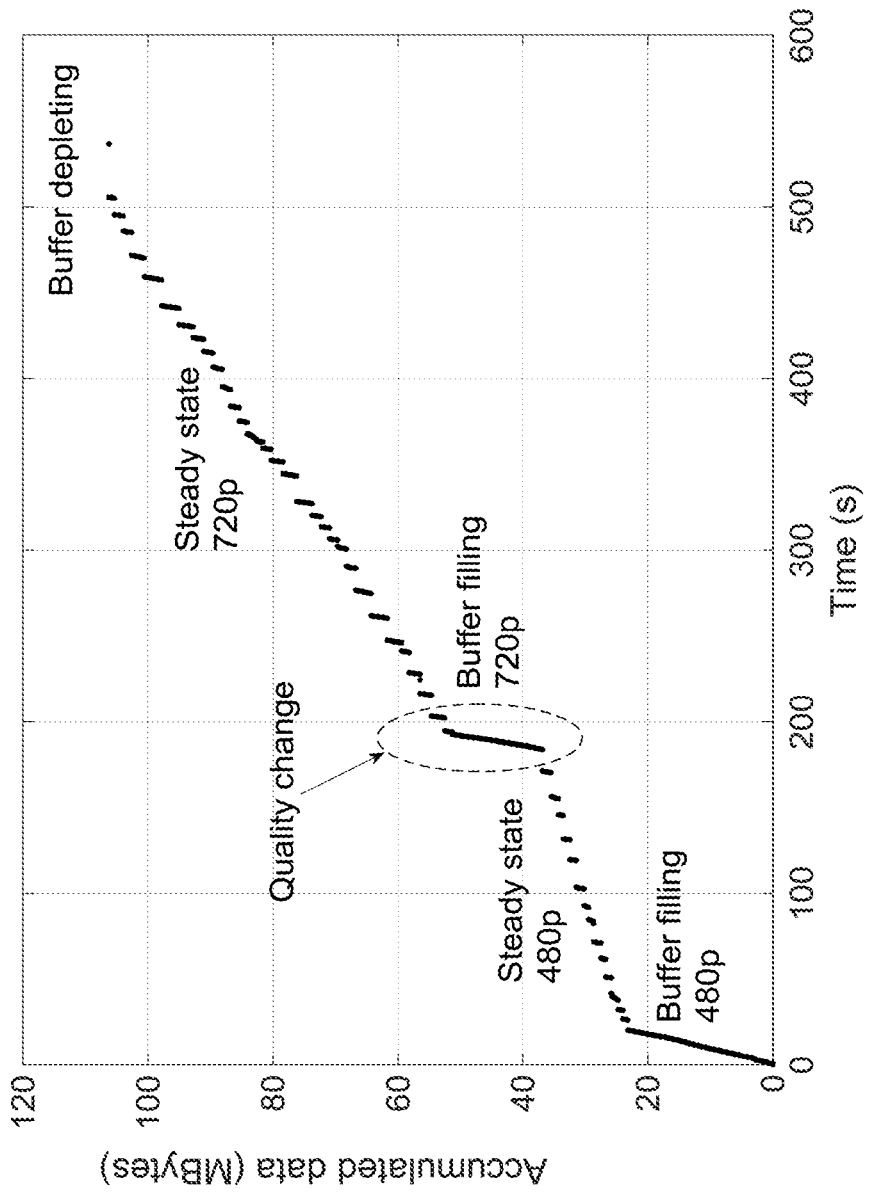
FIG. 7 shows a cumulative sum of streaming data over time with a quality change from 480p to 720p, according to an embodiment of the present invention.

Adaptation event: Once two different steady states (step denoted by "state change" in FIG. 4) of a selected and indexed video streaming flow are detected (step denoted by "detected multimedia flow" in FIG. 4) and their average streaming rate is calculated, an adaptation event may be estimated. For example, if the rate of the second steady state is higher than the rate of the first steady state, a quality increase is estimated. Conversely, if the rate of the second steady state is lower than the rate of the first steady state, a quality decrease is then estimated. For illustrative purposes, FIG. 7 shows an estimated quality increase of the streaming rate after a video quality change from 480p to 720p at a time close to 200 seconds.

Figure 8:
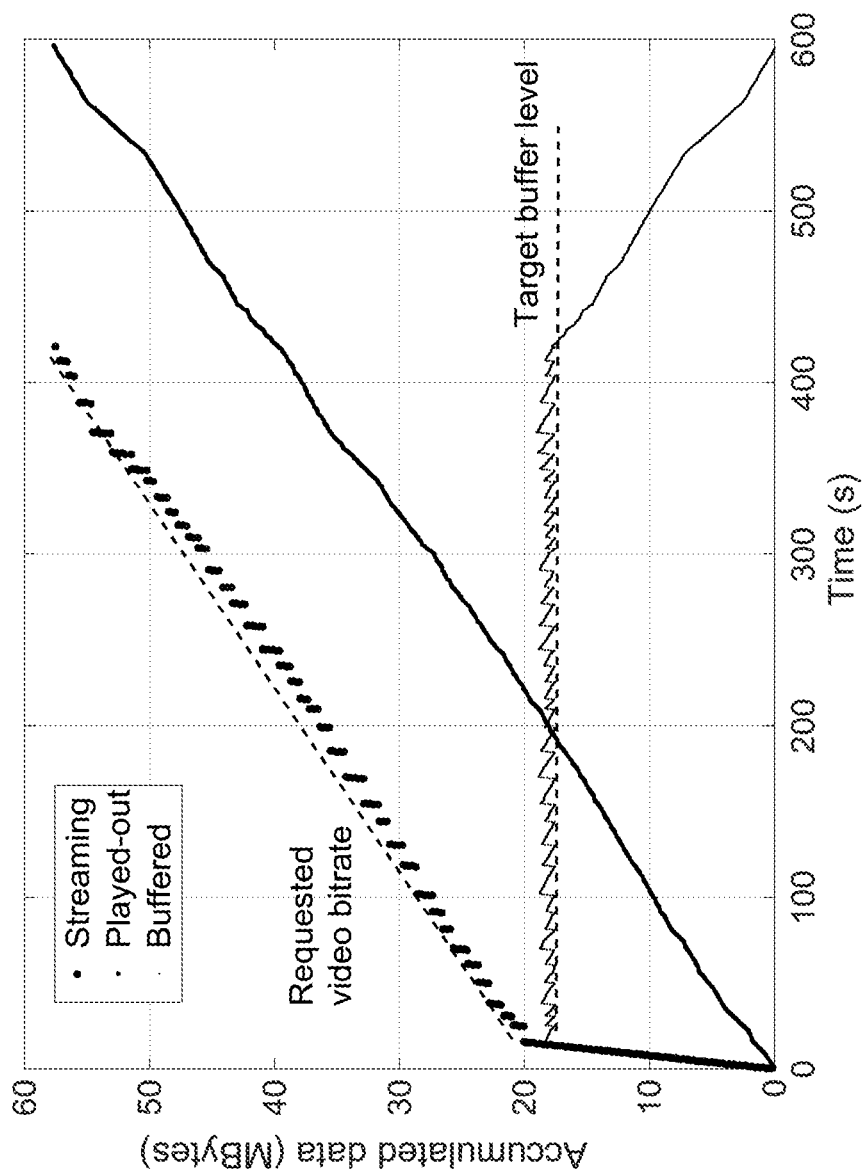
FIG. 8 shows an exemplary target buffer level for a 480p quality, according to an embodiment of the present invention.

Target buffer level: Once the source coding rate of the steady state is evaluated, the target buffer level may be estimated. As depicted in FIG. 8 showing an exemplary target buffer level for a 480p quality, the target buffer level may be considered the level of the playback buffer that is kept almost stable during the steady state. The target buffer level ($d_B$, $T_B$) may be estimated with the help of the estimated streaming rate ($r_s$) during the steady state and the estimated size of the filling state ($d_F$) in Bytes. For example, the target buffer level may be given by:

$$d_B = d_F - (t_F^e - t_F^s) r_S \tag{5}$$

$$T_B = \frac{d_F}{r_S} - (t_F^e - t_F^s) \tag{6}$$

where $d_B$ is the target buffer level expressed in Bytes, $T_B$ is the target buffer level expressed in seconds, $t^e_F$ is the start time of the filling state, and $t^s_F$ is the end time of the filling state.

Latency class: Once the target buffer level is estimated, the latency class of the selected and indexed video streaming flow may be estimated in turn, since VoD streaming has a much higher target buffer level that live streaming. As larger buffers allow longer streaming in case of connectivity loss, the target buffer level may identify the latency tolerance of a particular streaming type. Since the buffer levels targeted by VoD and live streaming differ substantially, a static threshold of, for example, 50 s, may be used to separate the two classes at high accuracy.

Current buffer level: Once the target buffer level ($T_B$) and the source coding rate ($r_s$) for each steady-state phase are estimated, the current buffer level may be estimated while the playback buffer state is low. For example, the current buffer level may be given by:

$$d_C(t_L) = d_B + (r_L - r_S)(t_L - t_{L,0}) \quad (7)$$

$$T_C(t_L) = T_B + \left(\frac{r_L}{r_S} - 1\right)(t_L - t_{L,0}) \quad (8)$$

where $d_C$ is the current buffer level in Bytes, $T_C$ is the current buffer level in seconds, $t_{L,0}$ is the start time of the depletion playback buffer state, $t_L$ is the current time during this state, and $r_L$ is the average streaming time from $t_{L,0}$ to $t_L$.

Figure 9:
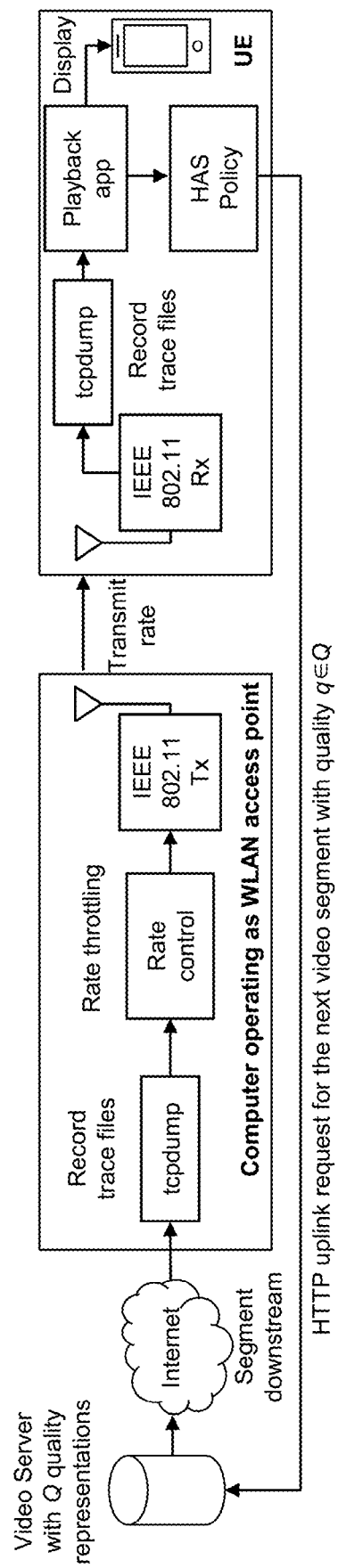
FIG. 9 shows an experimental setup with a wireless local area network (WLAN) interface, according to an embodiment of the present invention.

The estimation accuracy of the multimedia-related information provided from the traffic profiling apparatus 110 has been measured for the popular streaming service of YouTube with more than 700 hours of analyzed streaming traffic and by means of the experimental setup of FIG. 9. Although an IEEE 820.11g WLAN interface has been used therein, a long-term evolution (LTE) may alternatively be used.

An example of an experimental setup, implemented by the inventors, comprises the following features:

User equipment (UE): Two Nexus 6P Smartphones with firmware version angler-03.61 and operation system Android 6.0.1;

Access point: Linux PC, which operates as a WLAN access point, supports rate throttling, records packet traces, is connected via a T1 line to the Internet and acts a gateway for the UE. Rate throttling is automatically controlled using the native traffic configuration tool of Linux, and packets logs are recorded by a tcpdump packet analyzer as found at: http://www.tcpdump.org;

Connection: WLAN operates in IEEE 820.11g mode at a carrier frequency of 2412 MHz. Due to the close distance between the UE and the WLAN access point, the signal-to-interference-plus-noise ratio (SINR) was 23 dB over the wireless link, which provides the maximum physical layer rate of 54 Mbit/s;

Native YouTube application (version 10.28.60) for Android: used to generate the streaming traffic and performs standard DASH operation. The YouTube application protects its streaming traffic via TLS so that HTTP queries are sent to the server TCP port 443;

Average round-trip-time (RTT): 28 ms;

2 studied video, which are commonly used for testing streaming protocols (codec: H.264, container: MP4, segment duration 5 s): the first video is Big Buck Bunny (BBB) of a duration of 9:56 min and the second one is Tears of steel (TOS) of a duration of 12:14 min;

4 tested scenarios for each video with 120 repetitions per scenario and respectively consisting of: MQ: medium quality (480p) for the entire video, HQ: high quality (720p) for the entire video, QC: quality change (from 720p to 480p) at a random time in the interval [120, 240] s of the video, AQ: adaptive quality selection with 90 s of rate throttling to 300 Kbit/s, starting at a random time in the interval [120, 240] s of the video.

The accuracy of the buffer state detection is disclosed in the confusion matrix of FIG. 10, which summarizes the performance over the complete set of experiments with a very high accuracy of buffer state detection in the 99% regime.

Figure 11:
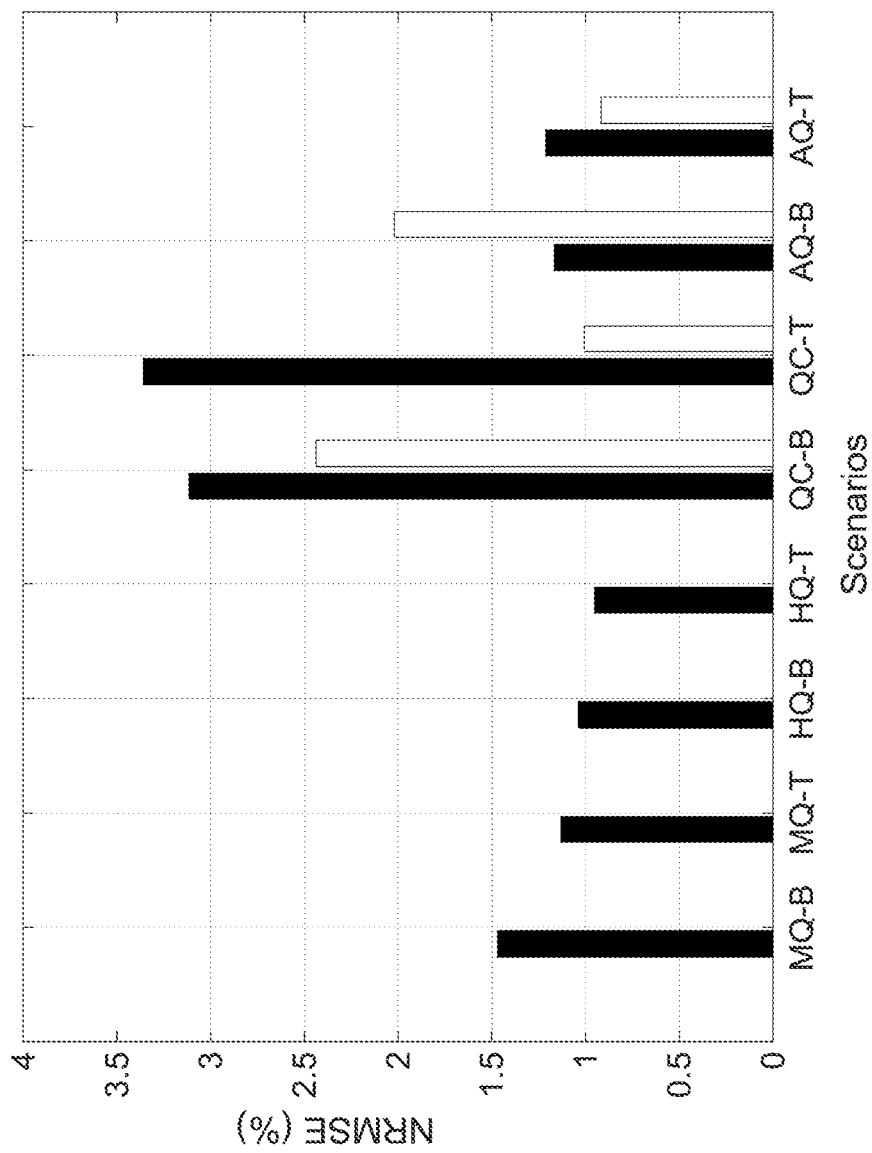
FIG. 11 shows the normalized root mean square error (NRMSE) of the accuracy of the source coding rate estimation versus multiple scenarios with one or more than one steady state, according to an embodiment of the present invention.
Figure 12:
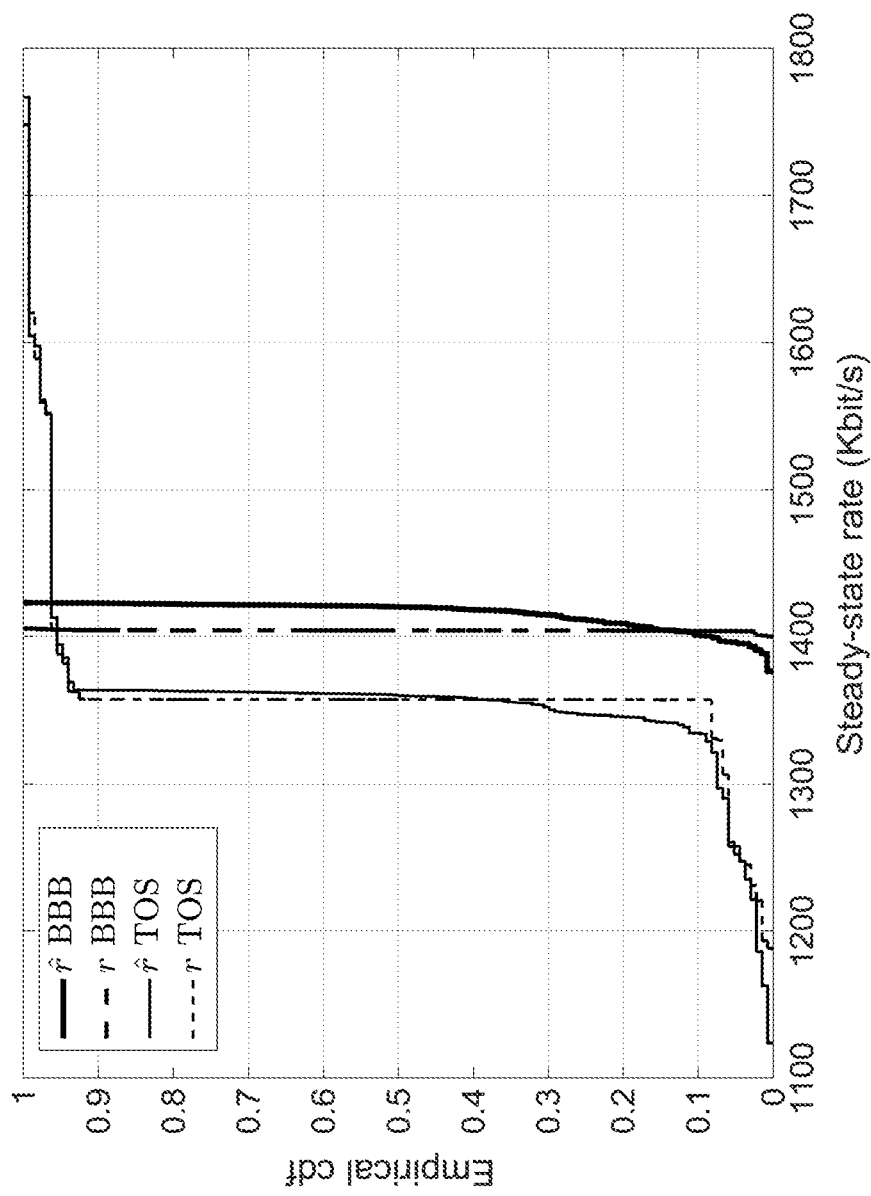
FIG. 12 shows an empirical cumulative distribution function (cdf) for two movies versus the steady-state rate in the case of a high quality (HQ) scenario, according to an embodiment of the present invention.

The bar graph of FIG. 11 shows the NRMSE of the source coding rate estimation accuracy versus multiple scenarios with one or more steady states. Regarding the scenarios, the suffixes "-B" and "-T" indicate the BBB and TOS movies, respectively. As a normalization factor, the average true video bit-rate per steady-state has been used. As can be gathered therefrom, the maximum NRMSE is less than 3.5%, which indicates a very high source coding rate estimation accuracy and corresponds to 40 kbit/s in this set of experiments. An exemplary empirical cdf in the case of the HQ scenario is illustrated in FIG. 12. As can be seen therein, the estimated rate ($\hat{r}$) (depicted by a solid line) is very close to the true video bit-rate (r) (depicted by a dashed line), with a slight over-estimation for the BBB movie with respect to the TOS movie. Moreover, it can be seen that the empirical cdf for the TOS movie span over a larger range of values with respect to the BBB movie, thereby indicating the higher dynamic of the TOS movie.

Thus, embodiments of the present invention may provide highly accurate multimedia-related or video information with low computational effort, and find application, for example, in:

network optimization: traffic-aware schedulers, handover, dynamic routing;

traffic shaping: bandwidth throttling, load control, admission control; and network analytics: quality-of-service (QoS) reporting, QoE reporting, type of service classification, real-time QoE estimation, DPI appliances (in order to increase accuracy).

Compared in particular to DPI and cross-layer signaling, embodiments of the present invention may have, for example, the following advantages:

no dependency on tags or cross-layer information, which might be maliciously manipulated;

no required standardization of cross-layer interfaces, which may be of uncertain outcome and adoption;

no direct access to the application-layer, which may violate user privacy and/or legal boundaries; and no need to weaken end-to-end encryption via TLS and/or SSL, which would be technically complex and problematic with end-user clients (warnings and alarms by browser or security software).

In summary, the present disclosure relates to traffic profiling in real time within a video streaming session. First, multiple data packet flows at a lower layer of the OSI model are observed. A data packet flow pattern is obtained for each observed flow, and each obtained pattern is compared to a pre-defined characteristic streaming pattern. From the observed flows, any data packet flow that has its data packet flow pattern close to the pre-defined characteristic streaming pattern is selected as a video streaming flow. The selected video streaming flow is indexed using information from a header of any data packet from the selected video streaming flow, and a buffer state of the indexed video streaming flow is identified amongst a filling state, a steady state and a depletion state, by observing over time a slope of data accumulated during the observation of the data packet flows. Eventually, multimedia-related information of the indexed video streaming flow is provided based on its data packet flow pattern.

While the present invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected, by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus for profiling video streaming traffic in real time within a video streaming session, wherein the video streaming traffic comprises one or more data packet flows, the apparatus comprising:
a processor and/or discrete hardware being configured to:
obtain, for each respective data packet flow of the one or more data packet flows, a respective data packet flow pattern based on the respective data packet flow;
compare each obtained data packet flow pattern to a pre-defined characteristic streaming pattern;
select, from the one or more data packet flows, a video streaming flow, the video streaming flow being a respective data packet flow having a data packet flow pattern close to the pre-defined characteristic streaming pattern;
identify, by observing a slope of accumulated data of the selected video streaming flow over time, a buffer state of the selected video streaming flow, the buffer state being one of a filling state, a steady state subsequent to the filling state, and a depletion state; and
provide multimedia-related information of the selected video streaming flow based on the data packet flow pattern of the selected video streaming flow and the identified buffer state of the selected video streaming flow pattern.

2. The apparatus of claim 1, wherein the video streaming session is a hypertext transfer protocol adaptive streaming (HAS) session.

3. The apparatus of claim 2, wherein the respective data packet flow pattern is obtained by observing each data packet from the respective data packet flow, each observed data packet being placed in a transmit queue.

4. The apparatus of claim 3, wherein the respective data packet flow pattern comprises a size and a timestamp of each data packet from the respective data packet flow.

5. The apparatus of claim 4, wherein the selected video streaming flow is indexed by a source internet protocol (IP) address of the selected video streaming flow and destination transmission control protocol (TCP) ports of the selected video streaming flow.

6. The apparatus of claim 5, wherein the buffer state of the selected video streaming flow is identified based on a determination of both a streaming rate pattern and an on-off transmission pattern of data bursts.

7. The apparatus of claim 6, wherein the buffer state of the selected video streaming flow is identified based, additionally, on a timestamp of each data packet with a hypertext transfer protocol (HTTP) GET request in a respective HTTP header field.

8. The apparatus of claim 6, wherein the buffer state of the selected video streaming flow is identified as the filling state upon detection of long data bursts and wherein the buffer state of the selected video streaming flow is identified as the steady state upon detection of iterative shorter data bursts of similar duration.

9. The apparatus of claim 8, wherein the streaming rate of the streaming rate pattern is estimated in the steady state.

10. The apparatus of claim 9, wherein the determination of the streaming rate pattern is performed by observing a slope of an accumulated size of data packets over time, timestamps of the data packets being used for time reference, and wherein the determination of the on-off transmission pattern of data bursts is performed by analyzing the timestamp and the size of each data packet in order to separate data bursts and obtain characteristics of duration and rate for each data burst.

11. A method for profiling video streaming traffic in real time within a video streaming session, wherein the video streaming traffic comprises one or more data packet flows, the method comprising:
obtaining, for each respective data packet flow of the one or more data packet flows, a respective data packet flow pattern based on the respective data packet flow;
comparing each obtained data packet flow pattern to a pre-defined characteristic streaming pattern;
selecting, from the one or more data packet flows, a video streaming flow, the video streaming flow being a respective data packet flow having a data packet flow pattern close to the pre-defined characteristic streaming pattern;
identifying, by observing a slope of accumulated data of the selected video streaming flow over time, a buffer state of the selected video streaming flow, the buffer state being one of a filling state, a steady state subsequent to the filling state and a depletion state; and
providing multimedia-related information of the selected video streaming flow based on the data packet flow pattern of the selected video streaming flow and the identified buffer state of the selected video streaming flow pattern.

12. The method of claim 11, wherein obtaining the respective data packet flow pattern comprises observing each data packet from the respective data packet flow, each observed data packet being placed in a transmit queue.

13. The method of claim 11, wherein the data packet flow pattern comprises a size and a timestamp of each data packet from the respective data packet flow.

14. The method of claim 13, wherein selecting the video streaming flow comprises indexing the selected video streaming flow by a source internet protocol (IP) address of the selected video streaming flow and destination transmission control protocol (TCP) ports of the selected video streaming flow.

15. The method of claim 14, wherein identifying the buffer state of the selected video streaming flow comprises determining both a streaming rate pattern and an on-off transmission pattern of data bursts.

16. The method of claim 15, wherein the step of determining the streaming rate comprises observing a slope of an accumulated size of packets over time, wherein packet timestamps are used for time reference, and wherein determining the on-off transmission pattern of data bursts comprises analyzing the timestamp and the size of each data packet in order to separate data bursts and obtain characteristics of duration and rate for each burst.

17. The method of claim 16, wherein identifying the buffer state of the selected video streaming flow comprises matching, in terms of type of state and time of change, a change in a streaming rate and a change in an on-off transmission pattern of data bursts.

18. The method of claim 11, wherein identifying the buffer state of the selected video streaming flow comprises implementing a classification model.

19. A computer program product comprising a non-transitory computer readable medium having stored thereon computer executable instructions that, when executed by a computer, cause the computer to perform the method according to claim 11.

* * * * *